H. MATTHEWS.
POEK OR LIKE SCORER.
APPLICATION FILED FEB. 15, 1909.
939,846.
Patented Nov. 9, 1909.
2 SHEETS—SHEET 1.
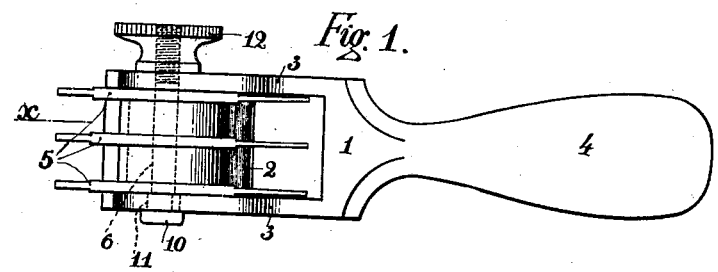
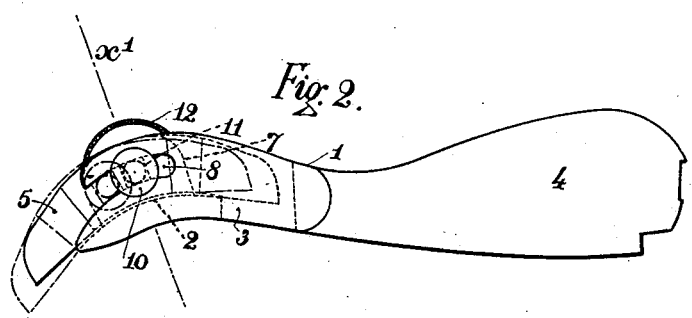
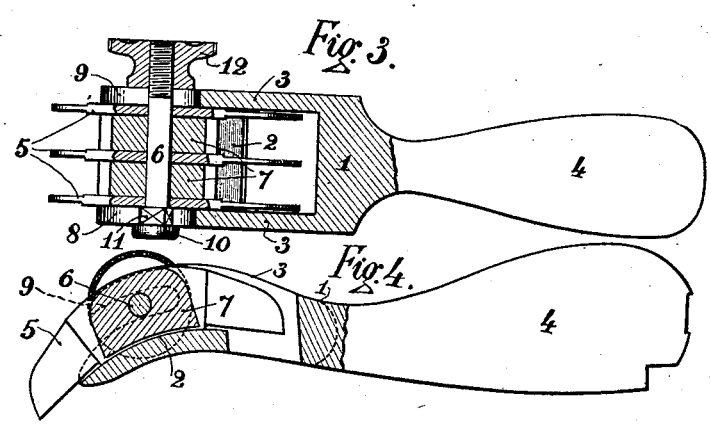
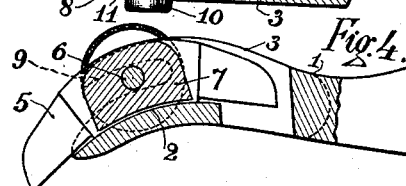
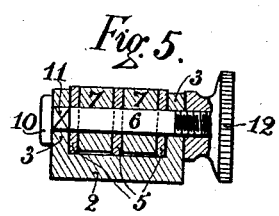
WITNESSES
INVENTOR *Herbert Matthews*
BY
*James L. Norris*
Atty.

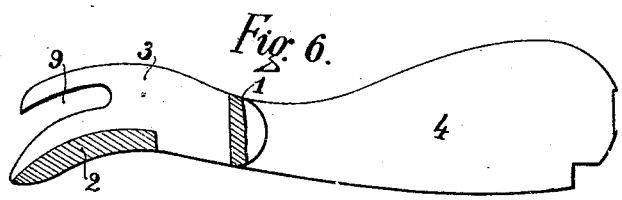
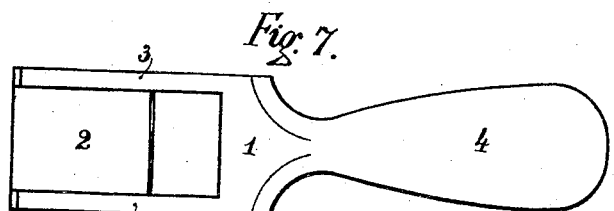
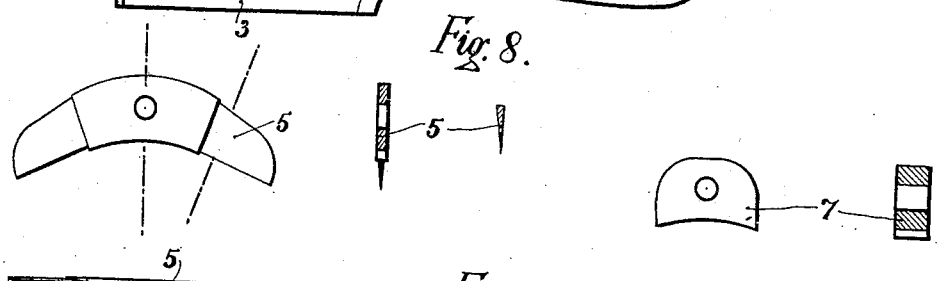
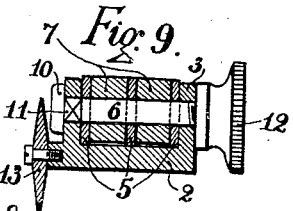
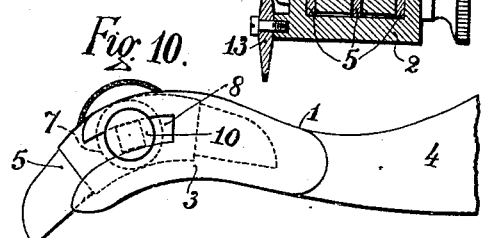
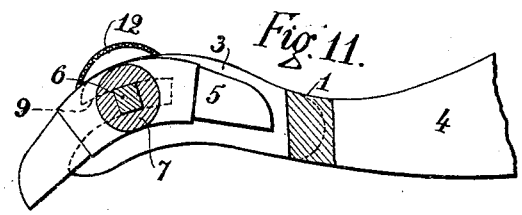

UNITED STATES PATENT OFFICE.

HERBERT MATTHEWS, OF KIDDERMINSTER, ENGLAND.

PORK OR LIKE SCORER.

939,846. Specification of Letters Patent. Patented Nov. 9, 1909.

Application filed February 15, 1909. Serial No. 478,083.

*To all whom it may concern:*

Be it known that I, HERBERT MATTHEWS, subject of the King of Great Britain, residing at 119 Coventry street, Kidderminster, England, have invented certain new and useful Improvements in Pork or Like Scorers, of which the following is a specification.

This invention relates to appliances for scoring or opening the skin of pork, bacon and other meat previous to cooking, for the purpose of facilitating carving.

The object of the present invention is to provide an improved scorer having simple but effective means for readily adjusting the depth of the cut, and having double-ended knives or blades which can be reversed when required, so as to lengthen the time said blades can be used before same need be re-sharpened. Means are also provided for automatically altering the rake or inclination of the blades as the depth of cut is adjusted.

Figure 1 of the accompanying drawings represents a plan of the improved scorer constructed in accordance with this invention. Fig. 2 is a side elevation of same, showing the arrangement of the guide slots in the side of the holder or body for permitting of the adjustment of the knives for the purpose of regulating the depth of cut. Fig. 3 shows a horizontal section through the holder and knives, showing the cross pin upon which the latter are threaded. Fig. 4 is a longitudinal section on line $x$ Fig. 1. Fig. 5 is a transverse section on line $x^1$ Fig. 2. Fig. 6 represents a section through the holder with the knives removed. Fig. 7 shows same in plan. Fig. 8 represents one of the knives in edge view, side elevation and section, and also one of the distance pieces in side elevation and section. Fig. 9 shows a modification in which the holder is provided with a guide at one side. Fig. 10 is a side view of a modification in which the transverse clamping pin is of square section and passes through square holes in the knives, and in which the holder or body has an open bottom. Fig. 11 is a longitudinal section through same.

The same reference numerals indicate corresponding parts in each of the figures of the drawings.

The improved appliance comprises a hollow box-like holder or body part 1, open at the top and outer end, and having the bed 2 and sides 3 curved or cambered in the direction of their length as shown. The said holder 1, which is continued rearward into a handle 4, is arranged to receive the knives or blades 5 which are arranged longitudinally so that their front ends extend beyond the front edge of the bed 2. Said knives are held upon a transverse pin 6 with distance pieces or spacing blocks 7 between them to give the necessary width to the scorings. The pin passes through open-ended guide races or slots 8, 9 in the opposite sides of the holder 1, curved to the same radius as the bed 2. The one end of the pin 6 is provided with a head 10 which bears upon the side of the body and a square shoulder 11 which slidably fits within the slot 8 so as to prevent rotation of the pin. The opposite end of the latter is screwed and fitted with a milled or otherwise roughened clamping nut 12 which is adapted, when screwed up, to take its bearing upon the body 1 and securely clamp the pin 6 and knives 5 in any desired position. The depth of cut can be adjusted by slackening the nut 12 and sliding the pin 6 within the slots 8, 9, so moving the knives longitudinally and causing the front ends of the latter to extend from the holder more or less as required.

The knives or blades are double-ended as shown so that when the one end has become worn, they can be reversed by bodily removing them, together with the pin 6, from the holder 1, (by sliding said pin through the open ends of the slots), and replacing them the other way around. Said knives are curved as shown, to the same radius as the slots 8, 9 and bed 2 upon which latter the middle parts of their undersides rest. The distance pieces 7 are also shaped to seat themselves upon the bed. As therefore the knives are adjusted longitudinally to regulate the depth of cut, they move in an arc of a circle having the same curvature as said bed and slots so that their rake or inclination is automatically altered, giving a greater inclination the greater the depth of the cut.

The knives can be readily ground when required by removing them from the holder 1; or they can be sharpened when in position within said holder.

If necessary the distance pieces 7 can be removed and others of different widths substituted, thereby altering the width of the scoring.

In the modification shown in Fig. 9, the one side of the body is provided upon its underside with a guide in the form of a wheel 13 (preferably detachable) which, when making the first cut, bears against the side of the pork or the like.

In the further modification shown in Figs. 10 and 11, the holder 1 is open at the bottom, merely consisting of a fork between which the knives 5 are threaded upon the pin 6. To admit of the inclination of the knives being altered as the latter are adjusted, the pin 6 is made square (or other angular section), and passes through square holes in the knives and distance pieces. Instead of reversible knives being used, ordinary single knives may be employed. Also a single knife may be used instead of a plurality.

Having fully described my invention, what I desire to claim and secure by Letters Patent is:—

1. In a pork or like scorer, a holder having a curved bed and provided with open ended guide slots, and knives and distance pieces mounted within the holder and conforming to the curvature of the said bed.

2. In a pork or like scorer, the combination with a holder, of a plurality of knives within said holder, said holder forming a guard with open ended slots in the sides thereof, a pin passing transversely through said knives and the slots and adapted to lock the knives with the cutting edges in any desired position relative to the guard.

3. In a pork or like scorer, a holder having a curved extremity with slotted sides, a clamping means movably mounted in the slotted sides and a plurality of knives held in spaced relation on the clamping means and all simultaneously and equally movable with the clamping means in the end of the holder.

4. A pork or like scorer comprising a holder having a longitudinally chambered bed, and sides adjacent to the bed provided with slots curved similarly to the bed, laterally separated curved knives carried by said holder which seat themselves upon said chambered bed, a transverse pin passing through said knives and seated in slots in the sides of the holder, and a clamping nut on the end of the pin for securing same at any desired position in said slots, whereby the knives can be adjusted so as to extend more or less from the front of the holder.

In testimony whereof I have hereunto set my hand in presence of two subscribing witnesses.

HERBERT MATTHEWS.

Witnesses:
    HENRY SKERRETT,
    HENRY NORTON SKERRETT.